United States Patent [19]
Tanaka et al.

[11] Patent Number: 5,989,106
[45] Date of Patent: Nov. 23, 1999

[54] FERRULE FOR USE WITH AN OPTICAL FIBER CONNECTOR AND METHOD FOR PRODUCTION THEREOF

[75] Inventors: Mamoru Tanaka; Shigeru Kitamura, both of Toyama-ken, Japan

[73] Assignee: YKK Corporation, Tokyo, Japan

[21] Appl. No.: 09/140,598

[22] Filed: Aug. 26, 1998

Related U.S. Application Data

[62] Division of application No. 08/812,264, Mar. 6, 1997, Pat. No. 5,862,280.

[30] Foreign Application Priority Data

Mar. 8, 1996 [JP] Japan .................................. 8-079383

[51] Int. Cl.⁶ ...................................................... B24B 1/00
[52] U.S. Cl. .............................................. 451/49; 451/51
[58] Field of Search ............................. 451/49, 209, 210, 451/243, 246, 51

[56] References Cited

U.S. PATENT DOCUMENTS

| | | |
|---|---|---|
| 2,560,023 | 7/1951 | Workman ............................... 451/49 X |
| 3,555,745 | 1/1971 | Ueda ........................................ 451/49 |
| 3,855,734 | 12/1974 | Fournier ............................. 451/243 X |
| 4,649,616 | 3/1987 | Bricker . |
| 4,766,700 | 8/1988 | Kramberg et al. .................... 451/49 X |
| 5,216,734 | 6/1993 | Grinderslev . |
| 5,278,928 | 1/1994 | Ueda et al. . |
| 5,299,388 | 4/1994 | Bishop ................................. 451/49 X |
| 5,339,521 | 8/1994 | Kawase ................................ 451/49 X |
| 5,533,931 | 7/1996 | Imai et al. ............................ 451/49 X |
| 5,615,291 | 3/1997 | Makoto et al. . |

FOREIGN PATENT DOCUMENTS

| | | |
|---|---|---|
| 0 506 003 A1 | 9/1992 | European Pat. Off. . |
| 0 539 193 A1 | 4/1993 | European Pat. Off. . |
| 0 626 601 A1 | 11/1994 | European Pat. Off. . |
| 1-45042 | 10/1989 | Japan . |
| 7-174937 | 7/1995 | Japan . |
| WO 87 01464 A1 | 2/1987 | WIPO . |
| WO 95/99373 | 4/1995 | WIPO . |

OTHER PUBLICATIONS

Patent Abstracts of Japan, vol. 095, No. 010, Nov. 30, 1995 and JP–A–07–174937 (Toto Ltd.) Jul. 14, 1995.

Patent Abstracts of Japan, vol. 095, No. 010, Nov. 30, 1995 and JP–A–07–168054 (The Furukawa Electric Co., Ltd.) Jul. 4, 1995.

Patent Abstracts of Japan, vol. 010, No. 038, Feb. 14, 1986 and JP–A–60–185909 (Noriyuki Kawai, et al.) Sep. 21, 1985.

*Primary Examiner*—Timothy V. Eley
*Attorney, Agent, or Firm*—Hill & Simpson

[57] ABSTRACT

A ferrule used for an optical fiber connector and a method for efficient production thereof are disclosed. The ferrule comprises a through-hole formed linearly along the axial line thereof and having a part of a small diameter for the insertion of an optical fiber, a part of a large diameter for the insertion of a sheathed optical fiber, and a diametrically tapered part intervening between the small diameter part and the large diameter part and diverging from the small diameter part to the large diameter part. The through-hole has a length of not less than 1 mm for the small diameter part and a length of less than 6 mm for the total of the small diameter part and the diametrically tapered part. In the production of this ferrule, the grinding work for the impartation of an outside diameter is implemented by causing the opposite end parts of a ceramic blank having an engaging part adapted to receive a rotational driving force to be rotatably supported with a double center cylindrical grinder and rotating a live center of the double center cylindrical grinder having formed thereon a fitting part for union with the engaging part thereby enabling the ceramic blank engaged with the live center to rotate and effecting the grinding work.

9 Claims, 7 Drawing Sheets

FERRULE FOR USE WITH AN OPTICAL FIBER CONNECTOR AND METHOD FOR PRODUCTION THEREOF

RELATED APPLICATION DATA

This application is a division of U.S. application Ser. No. 08/812,264 filed Mar. 6, 1997 now U.S. Pat. No. 5,862,280, Attorney Docket No. P97,0473. The foregoing application is incorporated herein by reference to the extent not already presented herein. The present and foregoing application claims priority to Japanese application No. P08-79383 filed Mar. 8, 1996.

BACKGROUND OF THE INVENTION

1. Field of the Invention

This invention relates to a ferrule of an optical fiber connector or optical connector to be used for connecting optical fibers and a method for the production thereof.

2. Description of the Prior Art

Generally, the optical fiber connector, as illustrated in FIG. 1, for example, is composed of a plug 100 to which is connected an optical fiber cord 110 having an optical fiber inserted and fixed therein along the central axis thereof and a hollow cylindrical sleeve 120 adapted to couple and align two such plugs. Unlike the electric connector, the optical fiber connector is particularly required to align exactly the opposed ends of two optical fibers to be connected.

For this purpose, a ferrule 101 which is made of a ceramic substance and adapted for the insertion of the leading ends of two very thin optical fibers to be connected is popularly used. The connection of the two optical fibers is attained by abutting two such ferrules 101 against each other. Specifically, it is based on the procedure which comprises causing two ferrules 101 each having the leading end of an optical fiber inserted and fixed therein to be severally fixed concentrically to two plugs 100 finished in a prescribed outside diameter, inserting the two plugs 100 into one sleeve 120 through the opposite ends thereof, and abutting the ferrules 101 against each other thereby aligning the axes of the optical fibers.

The conventional ferrules for optical fiber connectors have been known to come in such a typical shape as is disclosed, for example, in Japanese Patent Publication No. 1-45042. The ferrule of this shape comprises a ferrule or capillary 101 having formed along the axial line thereof a through-hole 102 having a small diameter and an ample length for the insertion of an optical fiber (or an optical fiber strand) and a flange 104 fixed to one end part of the ferrule 101 and having a through-hole 105 of a large diameter formed along the axial line thereof for the insertion of a sheathed optical fiber (an optical fiber covered with a sheath) as illustrated in FIG. 2. It is assembled by causing the end part of the ferrule 101 having a tapered bore part 103 formed therein to be fixed by close fit or adhesion to a leading end hole part 106 of the flange 104 and consequently enabling the through-hole 102 of a small diameter in the ferrule 101 to be connected to the through-hole 105 of a larger diameter in the flange 104 through the medium of the tapered bore part 103.

The attachment of the optical fiber to the ferrule 101 of this construction is implemented by stripping a sheathed optical fiber 107 of a sheath 109 at the leading end part thereof thereby exposing an optical fiber 108 in a prescribed length, as illustrated in FIG. 3, applying an adhesive agent to the exposed optical fiber and the leading end part of the sheathed optical fiber, then inserting the exposed optical fiber 108 into the through-hole 102 of a small diameter of the ferrule 101 as shown in FIG. 2 from the flange side, and fixing the leading ends of the optical fiber 108 and the sheathed optical fiber 107 with the adhesive agent to the interiors of the through-hole 102 of the ferrule 101 and the through-hole 105 of the flange 104.

Besides the ferrule described above, a ferrule in which a through-hole containing both a part of a small diameter (hereinafter referred to briefly as "small diameter part") for the insertion of an optical fiber and a part of a large diameter (hereinafter referred to briefly as "large diameter part") for the insertion of the sheathed optical fiber is formed along the axial line thereof has been known as disclosed in published Japanese Patent Application, KOKAI (Early Publication) No. 7-174937, for example.

Quite naturally, these ferrules are invariably required to manifest high working accuracy in their outside diameters and in the inside diameters of their holes of a small diameter for the insertion of an optical fiber. Further, the degrees of eccentricity and parallelism of the outside diameters and the inside diameters mentioned above relative to the relevant axial lines constitute themselves important conditions for the accuracy of connection of the two optical fibers.

By this reason, the ferrules mentioned above are produced by extrusion molding or injection molding a ceramic substance thereby forming a ceramic ferrule blank containing a through-hole (formed hole), calcining the ceramic ferrule blank, passing a wire through the through-hole in the calcined ceramic ferrule blank, lapping the through-hole with diamond paste thereby imparting a prescribed inside diameter to the ferrule blank, passing a wire through the finished through-holes of a multiplicity of ferrule blanks, and performing a grinding work on the multiplicity of ferrules simultaneously thereby imparting a prescribed outside diameter thereto.

This method indeed has the advantage of allowing the grinding work for the impartation of an outside diameter to be performed simultaneously on a plurality of ferrule blanks and nevertheless incurs the disadvantage of spending a rather greater working time in the light of the necessity for allowing ample finishing allowance (grinding allowance) owing to the accumulation of dimensional variation among the individual ferrules due to the shrinkage after calcining. This method, when the ferrule itself has a through-hole of such a construction that the small diameter part for the insertion of an optical fiber and the large diameter part for the insertion of a sheathed optical fiber are connected to each other through the medium of a tapered part, is at a disadvantage in securing good concentricity between the outer circumference and the small diameter part of the through-hole only with difficulty because the length of the small diameter part for the insertion of an optical fiber as the basis for alignment is small.

Methods for overcoming this disadvantage have been proposed which are based on a common procedure comprising the steps of imparting an inside diameter to each of the ferrule blanks and then performing a grinding work for the impartation of an outside diameter with a cylindrical grinder on one after another of the ferrule blanks having a finished through-hole, as disclosed in published Japanese Patent Applications, KOKAI No. 5-113522 and No. 6-208042, for example. The methods thus proposed invariably adopt a mechanism which comprises holding one end of a blank by a work retaining part of a rotationally driven lathe dog or carrier and rotating the blank by transmitting the rotation of the lathe dog to the blank through the medium of the work retaining part. To be cylindrically ground, therefore, the ferrule must be provided with a leg portion to be held. Since this leg portion must be cut off the ferrule after the grinding work for the impartation of an outside diameter has been completed, this cutting work forms an extra burden. Since the lathe dog is utilized for the rotation of the blank, the preparatory steps for the attachment and detachment of the lathe dog inevitably bring about an increase in the time required for the grinding work even when the grinding work for the impartation of an outside diameter is automated. Thus, the number of component steps of the work increases, the time required for the work elongates, and the yield lowers. Accordingly, the methods are at a disadvantage in suffering these factors to increase notably the working cost.

When the ceramic blank of such a construction as possesses a through-hole containing the small diameter part for the insertion of an optical fiber and the large diameter part for the insertion of a sheathed optical fiber is to be obtained by a procedure involving the step of calcining subsequently to the step of injection molding, the formation of the small diameter part for the insertion of an optical fiber will inevitably require the use of a core pin containing a part of a very minute diameter as an injection molding die. This operation, therefore, has the problem of exposing the core pin to the possibility of sustaining breakage or shortening the service life because the core pin is bent by the injection pressure during the injection molding or suffered to generate bending stress each time the injection molding is repeated. From the viewpoint of solving this problem, an idea may be conceived of shortening the length of the part of the core pin having a minute diameter and consequently the length of the small diameter part in the ceramic blank for the insertion of an optical fiber. When the aforementioned method of first passing a wire through the through-hole of the ceramic blank and then grinding the ceramic blank for the impartation of an outer diameter is adopted for implementing this idea, however, it has the problem of impairing the concentricity between the outer circumference and the small diameter part of the through-hole and the cylindricality (deviation from a cylindrical form). Thus, the decrease in the length has its own limit. Even by the method which utilizes the rotary drive of the lathe dog mentioned above for the grinding work aimed at imparting an outside diameter, therefore, it is held that the shortest total length of the small diameter part for the insertion of an optical fiber and the tapered part that is attainable at all is not less than 6 mm.

Further, the core pin of the construction mentioned is difficult to fabricate and consequently is extremely expensive. The bend or the breakage which this core pin incurs, therefore, forms a large factor for boosting the cost of the ferrule.

In the case of the ferrule manufactured by the conventional method and having a long small-diameter through-hole for the insertion of an optical fiber, the breakage inflicted to the leading end part of the optical fiber during the insertion of the optical fiber into the ferrule or during the use of the optical fiber connector often poses a problem. Specifically, since the optical fiber is a very thin glass fiber, it has the drawback of readily sustaining a breakage. The insertion of the conventional optical fiber into a ferrule is attained by stripping the leading end part of the sheathed optical fiber 107 of the sheath 109 over a length greater than the length of the through-hole of a small diameter in the ferrule for the insertion of an optical fiber as illustrated in FIG. 3 and inserting the exposed part of the sheathed optical fiber 107 into the ferrule from the flange 104 side as illustrated in FIG. 2, for example. When the leading end of the exposed optical fiber collides against the inner surface of the tapered hole part 103 of the ferrule 101, bending stress (or buckling stress) is exerted on the leading end of the optical fiber. At this time, the stress is concentrated at the joint A between the sheathed optical fiber 107 and the exposed optical fiber 108 and the optical fiber 108 consequently becomes liable to bend at the joint. The breakage of the optical fiber of this nature can occur under the impact which is possibly generated when the optical fiber connector is accidentally dropped. Also for the sake of preventing the optical fiber from accidentally sustaining breakage during the work of inserting the optical fiber into the ferrule or during the use of the optical fiber connector, the merit of shortening the length of the small diameter part in the ferrule for the insertion of an optical fiber thereby allowing a decrease in the length of the exposed optical fiber has been finding growing recognition.

SUMMARY OF THE INVENTION

A primary object of the present invention, therefore, is to provide a ferrule which manifests high working accuracy in the outside diameter, circularity or roundness, and cylindricality of the ferrule and in the concentricity of the outer circumference and the through-hole of a small diameter for the insertion of an optical fiber and which has a small length for the through-hole of a small diameter for the insertion of an optical fiber as compared with the conventional ferrule.

Another object of the present invention is to provide a ferrule which has only sparing possibility of inflicting breakage on an optical fiber during the insertion thereof into the ferrule or during the use of an optical fiber connector.

A further object of the present invention is to provide a ferrule which is provided with an engaging part adapted to receive a rotational driving force and thereby enabled to be rotated with an opposed-center cylindrical grinder and consequently ground for acquisition of an outside diameter without requiring the use of a lathe dog or other similar tool.

Yet another object of the present invention is to provide a method for imparting an inside diameter and an outside diameter on a ferrule proper in a short working time and enabling a ferrule which manifests high working accuracy in the outside diameter, roundness, and cylindricality of the ferrule and in the concentricity of the outer circumference and the through-hole of a small diameter for the insertion of an optical fiber to be produced in a relatively short period, with high productivity and yield, and at a low cost.

To accomplish the objects mentioned above, in accordance with one aspect of the present invention, there is provided a ferrule to be used as attached to the leading end of an optical fiber connector. One fundamental mode of the ferrule of the present invention is provided with a through-hole formed linearly along the axial line thereof and having a part of a small diameter for the insertion of an optical fiber, a part of a large diameter for the insertion of a sheathed optical fiber, and a diametrically tapered part intervening between the small diameter part and the large diameter part and diverging from the small diameter part to the large diameter part, the through-hole having a length of not less than 1 mm for the small diameter part and a length of less than 6 mm for the total of the small diameter part and the diametrically tapered part.

In another fundamental mode of the ferrule for an optical fiber connector, which is provided with a through-hole formed linearly along the axial line thereof and having a part of a small diameter for the insertion of an optical fiber, a part of a large diameter for the insertion of a sheathed optical fiber, and a diametrically tapered part intervening between the small diameter part and the large diameter part and diverging from the small diameter part to the large diameter part, the ferrule has an engaging part adapted to receive a rotational driving force and formed at the free end part of the large diameter part of the through-hole. Also in this mode, preferably the through-hole has a length of not less than 1 mm for the small diameter part and a length of less than 6 mm for the total of the small diameter part and the diametrically tapered part.

In either of the modes mentioned above, it is desired that the angle of inclination of the diametrically tapered part is not more than 30 degrees. Furthermore, the small diameter part of the through-hole for the insertion of the optical fiber may be composed of two portions differing in inside diameter and interconnected through the medium of a diametrically tapered part.

In accordance with another aspect of the present invention, there is further provided a method for the production of such a ferrule for use in an optical fiber connector as described above. In the fundamental construction of this method, the grinding work for the impartation of an outside diameter to a ceramic blank is performed by the steps of: providing a ceramic blank having an engaging part adapted to receive a rotational driving force and formed in advance at one end part thereof; rotatably supporting the opposite end parts of the ceramic blank with a support center of a double center cylindrical grinder and a live center (rotating center) of the double center cylindrical grinder having formed thereon a fitting part adapted for union with the engaging part of the ceramic blank; and setting the live center rotating thereby enabling the ceramic blank engaged with the live center to rotate and effecting the grinding of the outer peripheral surface of the ceramic blank.

A more specific mode of the method of the present invention for the production of a ferrule for use in an optical fiber connector is characterized by comprising: (A) a step of injection molding a ceramic blank which is provided with a through-hole formed linearly along the axial line thereof and having a part of a small diameter for the insertion of an optical fiber, a part of a large diameter for the insertion of a sheathed optical fiber, and a diametrically tapered part intervening between the small diameter part and the large diameter part and diverging from the small diameter part to the large diameter part and which is further provided at the free end part of the large diameter part with an engaging part adapted to receive a rotational driving force; (B) a step of calcining the ceramic blank; (C) a step of performing the work for the impartation of an inside diameter on the small diameter part of the ceramic blank for the insertion of an optical fiber; and (D) a step of performing the grinding work for the impartation of an outside diameter to the ceramic blank, which step comprises rotatably supporting the opposite end parts of the ceramic blank with a support center of a double center cylindrical grinder and a live center of the double center cylindrical grinder having formed thereon a fitting part adapted for union with the engaging part of the ceramic blank, setting the live center rotating thereby enabling the ceramic blank engaged with the live center to rotate, and bringing a rotating grindstone into contact with the peripheral surface of the ceramic blank to effect the grinding work.

BRIEF DESCRIPTION OF THE DRAWINGS

Other objects, features, and advantages of the invention will become apparent from the following description taken together with the drawings, in which.

DETAILED DESCRIPTION OF THE PREFERRED EMBODIMENTS

Now, the present invention will be described more specifically below with reference to the accompanying drawings.

Figure 4A:
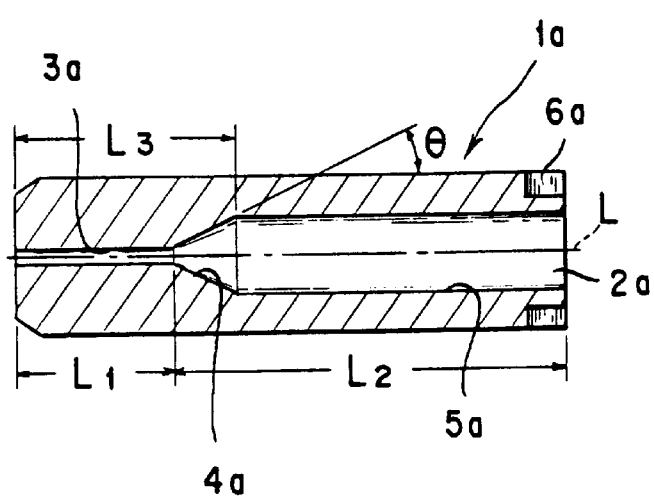
FIG. 4A is a schematic enlarged cross section of one example of the ferrule of the present invention and FIG. 4B is a right side view thereof.
Figure 4B:
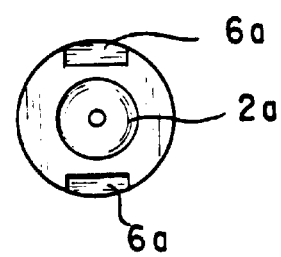

FIGS. 4A and 4B illustrate one embodiment of the ferrule of the present invention, FIG. 4A representing a cross section thereof and FIG. 4B a right side view thereof. A ferrule 1a in the diagram is provided with a through-hole 2a formed linearly along the axial line thereof and having a part 3a of a small diameter for the insertion of an optical fiber, a part 5a of a large diameter for the insertion of a sheathed optical fiber, and a diametrically tapered part 4a intervening between the small diameter part 3a and the large diameter part 5a and diverging from the small diameter part 3a to the large diameter part 5a. On the outer peripheral edge at the free end part of the large diameter part 5a of the ferrule 1a, a pair of opposed engaging parts (grooves) 6a adapted to receive a rotational driving force are formed.

Figure 5A:
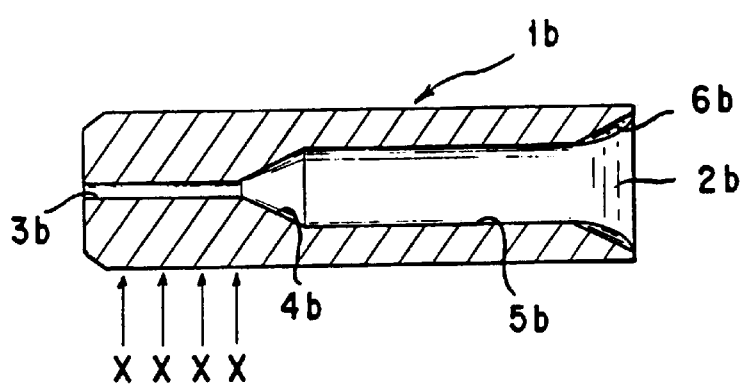
FIG. 5A is a schematic enlarged cross section of another example of the ferrule of the present invention and FIG. 5B is a right side view thereof.
Figure 5B:
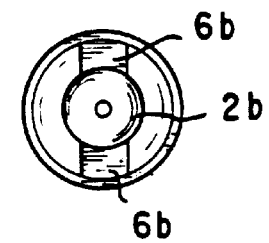
Figure 6A:
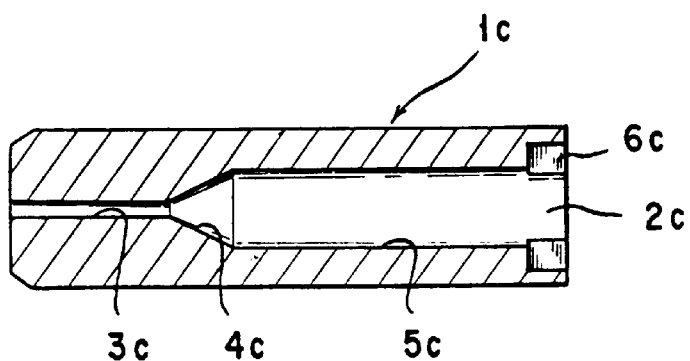
FIG. 6A is a schematic enlarged cross section of yet another example of the ferrule of the present invention and FIG. 6B is a right side view thereof.
Figure 6B:
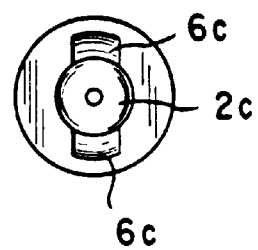

FIGS. 5A and 5B and FIGS. 6A and 6B illustrate modified examples of the ferrule illustrated in FIGS. 4A and 4B, the example illustrated in FIGS. 5A and 5B differing from the example illustrated in FIGS. 4A and 4B in having a pair of opposed slanted grooves 6b on the inner peripheral edge at the free end part of the large diameter part 5b in a ferrule 1b and the example illustrated in FIGS. 6A and 6B differing therefrom in having a pair of opposed rectangular grooves 6c on the inner peripheral edge at the free end part of the large diameter part 5c in a ferrule 1c respectively as a engaging part adapted to receive a rotational driving force. These examples are on a par with the example illustrated in FIGS. 4A and 4B in respectively possessing through-holes 2b and 2c comprising small diameter parts 3b and 3c for the insertion of an optical fiber, diametrically tapered parts 4b and 4c, and large diameter parts 5b and 5c for the insertion of a sheathed optical fiber.

For highly efficient production of a ferrule manifesting high working accuracy, the necessity for reducing the time spent for the impartation of an inside diameter and the time spent for the impartation of an outside diameter to the ferrule constitutes itself a major task. It must be simultaneously fulfilled for both the diameters.

The present invention, first with a view to alleviating the work of imparting inside diameters to the ferrules 1a, 1b, and 1c, changes the diameters of the through-holes 2a, 2b, and 2c to be formed in the ferrules stepwise along the axial lines, L, thereof thereby forming the small diameter parts 3a, 3b, and 3c for the insertion of an optical fiber, the diametrically tapered parts 4a, 4b, and 4c, and the large diameter parts 5a, 5b, and 5c for the insertion of a sheathed optical fiber and, at the same time, giving a length, $L_1$, of not less than 1 mm for the small diameter parts 3a, 3b, and 3c for the insertion of an optical fiber which are subjected to a wire lapping work and a length, $L_3$, of less than 6 mm for the total of the small diameter parts for the insertion of an optical fiber and the diametrically tapered parts (FIG. 4A). The reason for this particular fabrication is as follows.

The ceramic blank prepared for manufacture into a ferrule is injection molded in such a manner that, after undergoing a calcining treatment, the small diameter part of the through-hole for the insertion of an optical fiber has a smaller inside diameter than the outside diameter of the optical fiber and the large diameter part for the insertion of a sheathed optical fiber has a slightly larger inside diameter, preferably by a margin of 0.1–0.4 mm, than the outside diameter of the sheathed optical fiber. The through-hole formed therein, by the use of a wire passed therethrough, is lapped with such abrasive as diamond paste (wire lapping) until the small diameter part for the insertion of the optical fiber acquires a prescribed inside diameter substantially equal to the outside diameter of the optical fiber. The $L_2$ part (the diametrically tapered part and the large diameter part for the insertion of a sheathed optical fiber) retains the surface as formed by the calcining subsequently to the injection molding and is not worked. Thus, the length, $L_2$, has no effect to bear on the time spent for the impartation of an inside diameter.

Figure 7:
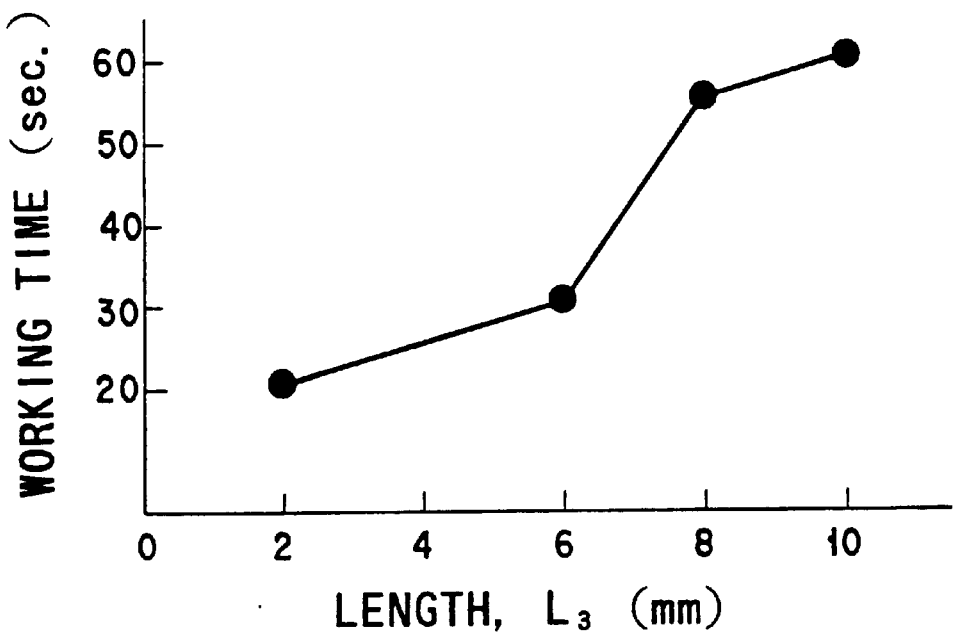
FIG. 7 is a graph showing the relation between the total length, $L_3$, of the small diameter part for the insertion of an optical fiber and the diametrically tapered part of a through-hole and the time for the wire lapping work for the impartation of an inside diameter.

When the small diameter part for the insertion of an optical fiber ($L_1$ part) having an inside diameter of 115 μm is to be wire lapped to an inside diameter of 125 μm, for example, the time of the wire lapping work spent per ferrule can be notably decreased when the length, $L_3$, is not more than 6 mm as shown in FIG. 7.

In the ferrule of the present invention, since a length, $L_3$, of less than 6 mm is given to the total of the small diameter part for the insertion of an optical fiber and the diametrically tapered part, the time to be spent for the wire lapping work can be markedly decreased as is evident from the results shown in FIG. 7.

If the length, $L_1$, of the small diameter part of the ferrule for the insertion of an optical fiber is less than 1 mm, the parallelism of the small diameter part 3a, 3b, or 3c to the outside diameter of the ferrule will not be easily attained and the connection of two optical fibers by the abutment of the end faces of the ferrules will be easily impaired. Thus, the length, $L_1$, must be not less than 1 mm.

Figure 8:
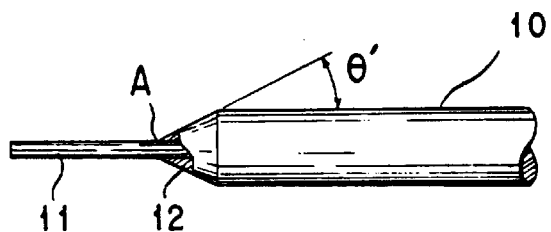
FIG. 8 is a partially cutaway schematic front view of a sheathed optical fiber stripped of a sheath in the leading end part thereof.
Figure 9:
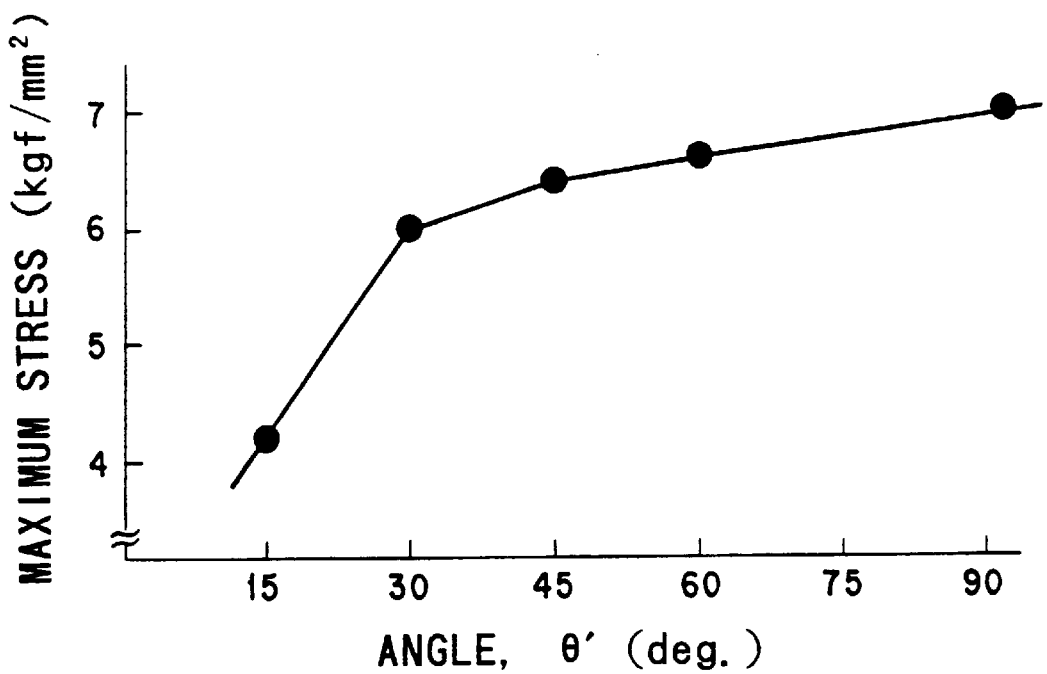
FIG. 9 is a graph showing the relation between the angle of stripping of the sheathed optical fiber and the maximum stress generated at the root of the optical fiber when a prescribed displacement is produced in the optical fiber.

It is desired that the angle of inclination, θ (FIG. 4A), of the diametrically tapered parts 4a, 4b, and 4c is not more than 30 degrees. Proportionately to this angle of inclination, the angle of stripping, θ', of the leading end part of a sheathed optical fiber 10 illustrated in FIG. 8 is not more than 30 degrees. Properly, the angle of stripping is equalized with the angle of inclination, θ of the diametrically tapered part mentioned above. The reason for setting the angle of inclination, θ, of the diametrically tapered part of the ferrule and the angle of stripping, θ', of the sheathed optical fiber below 30 degrees is for effectively preventing the optical fiber from breakage during the insertion of the optical fiber into the ferrule or during the use of the optical fiber connector and further for facilitating the work of insertion. In most cases, the breakage of the optical fiber occurs as mentioned above at the root A of an exposed optical fiber 11 (the joint between the sheathed optical fiber 10 and the exposed optical fiber 11). By structural analysis, it has been ascertained that the stress is concentrated at this site A. The results of this analysis are shown in FIG. 9. FIG. 9 shows a change in the maximum stress generated at the site A, i.e. the root of the optical fiber, when a prescribed lateral displacement is given to the leading end of the optical fiber 11. It is clearly noted from FIG. 9 that the stress is dispersed and the maximum stress generated in the optical fiber 11 is lowered when the angle of stripping, θ', of the sheathed optical fiber is not more than 30 degrees.

Figure 1:
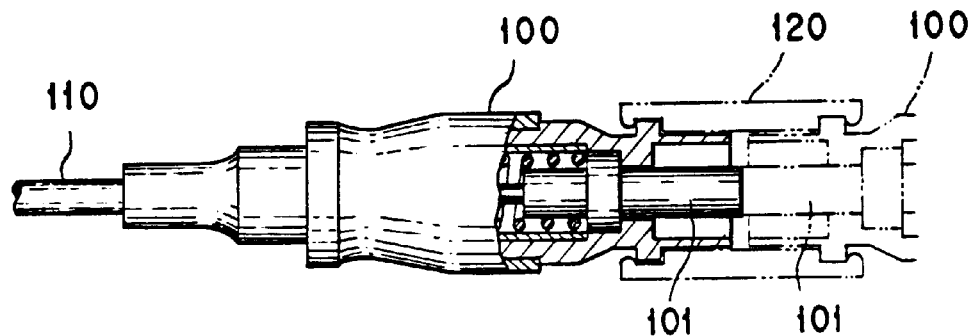
FIG. 1 is a partially cutaway schematic front view of one example of the conventional optical fiber connector.

The attachment of the optical fiber to the ferrule can be attained without inflicting any breakage on the optical fiber by stripping the sheathed optical fiber 10 of a sheath 12 in the leading end part thereof at an angle, θ', which corresponds to the angle of inclination, θ, of the diametrically tapered part of the ferrule, in a length equivalent to the small diameter part 3a, 3b, or 3c for the insertion of an optical fiber, applying adhesive agent to the leading end part of the sheathed optical fiber, and inserting the leading end part into the through-hole 2a, 2b, or 2c of the ferrule 1a, 1b, or 1c. Further, the work itself of inserting the optical fiber into the ferrule is stabilized and the adhesive strength between the optical fiber and the ferrule is sufficient. In this case, when the large diameter part 5a, 5b, or 5c for the insertion of a sheathed optical fiber in the ferrule 1a, 1b, or 1c is given an inside diameter larger by a margin of about 0.1–0.4 mm than the outside diameter of the sheathed optical fiber 10, by merely inserting the stripped sheathed optical fiber 10 into the through-hole 2a, 2b, or 2c of the ferrule, the adhesive agent applied to the leading end part of the sheathed optical fiber is enabled to permeate thoroughly as far as the leading end part of the small diameter part for the insertion of an optical fiber through the medium of the diametrically tapered part 4a, 4b, or 4c to induce adhesion of both the optical fiber 11 and the leading end of the sheathed optical fiber 10 to the through-hole 2a, 2b, or 2c of the ferrule with conspicuous strength owing to the interposition of the diametrically tapered part 4a, 4b, or 4c between the small diameter part 3a, 3b, or 3c for the insertion of an optical fiber and the large diameter part 5a, 5b, or 5c for the insertion of a sheathed optical fiber. The ferrule to which the optical fiber has been joined as described above, optionally after having the end face thereof ground together with that of the optical fiber, is fitted with a plug as illustrated in FIG. 1 and then put to use for the union of two optical fibers. The union of the two optical fibers in this case can be implemented with high stability.

For the sake of further decreasing the time to be spend for the impartation of the inside diameter, a small diameter part 3d for the insertion of an optical fiber in a ferrule 1d may be divided into two portions 7 and 9 differing in inside diameter and the two portions 7 and 9 of small diameters may be interconnected with a diametrically tapered part 8 of a small diameter or with a smooth curve. A large diameter part 5d for the insertion of a sheathed optical fiber and a diametrically tapered part 4d for interconnecting the large diameter part 5d and the small diameter part 3d mentioned above are identical in shape with those of the examples illustrated in FIG. 4A through FIG. 6B.

Figure 10:
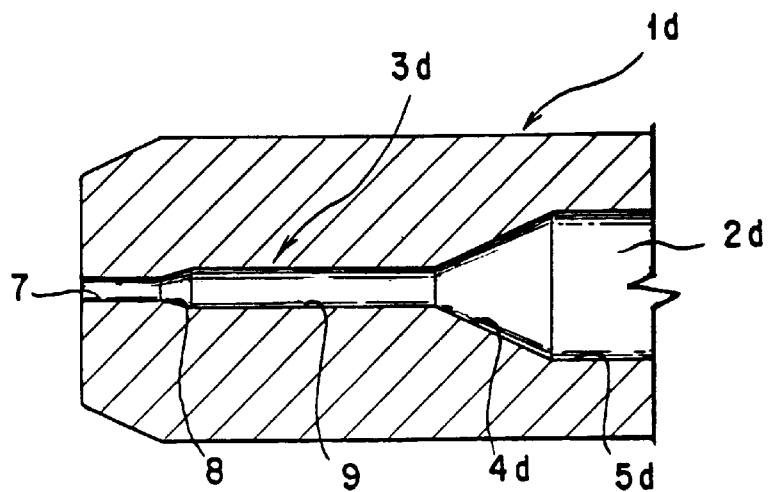
FIG. 10 is a fragmentary enlarged cross section of another example of the ferrule of the present invention.

The production of the ferrule 1d constructed as illustrated in FIG. 10 is attained by fabricating a ceramic blank wherein the leading end side part 7 of a small diameter of the small diameter part 3d for the insertion of an optical fiber has an inside diameter slightly smaller than the outside diameter of the optical fiber and the trailing end side part 9 of a small diameter of the part 3d has a slightly larger inside diameter than the outer diameter of the optical fiber and performing the wire lapping work only on the leading end side part 7 of a small diameter of the small diameter part 3d while allowing the trailing end side part 9 of a small diameter to avoid the wire lapping work and retain the inner surface as assumed after the calcining step. Thus, the time required for the wire lapping work can be decreased markedly. Further, the adhesive strength produced between the ferrule and the optical fiber is not lowered because the adhesive agent is allowed to permeate the trailing end side part 9 of a small diameter and the diametrically tapered part 8 of a small diameter of the small diameter part 3d through the medium of the diametrically tapered part 4d or even the leading end side part 7 of a small diameter.

The ferrule of the present invention for an optical fiber connector, as a fundamental embodiment thereof, possesses a shape produced by changing the diameter of a through-hole to be formed in a ferrule stepwise along the axial line thereof thereby forming a small diameter part for the insertion of an optical fiber, a diametrically tapered part, and a large diameter part for the insertion of a sheathed optical fiber sequentially in the order mentioned and, at the same time, giving a length of not less than 1 mm for the small diameter part which is subjected to a wire lapping work and a length of less than 6 mm for the total of the small diameter part for the insertion of an optical fiber and the diametrically tapered part. As a result, the time to be spent for the wire lapping work for the impartation of an inside diameter can be decreased notably. The time for the work of imparting an inside diameter can be decreased to a greater extent by dividing the small diameter part for the insertion of an optical fiber into two portions differing in inside diameter and interconnecting the two portions of small diameters with a diametrically tapered part.

The ferrule of the present invention, in another fundamental embodiment thereof, has an engaging part adapted to receive a rotational driving force and formed in the free end part of the large diameter part for the insertion of a sheathed optical fiber. By providing the engaging part of this kind for the ferrule and consequently for the ceramic blank, the ceramic blank can be directly rotated by a double center cylindrical grinder and given a grinding work for the impartation of an outside diameter with high working accuracy in spite of the decrease attained as described above in the length of the small diameter part for the insertion of an optical fiber.

Now, the method for the production of the ferrule of the present invention will be described below.

Figure 11:
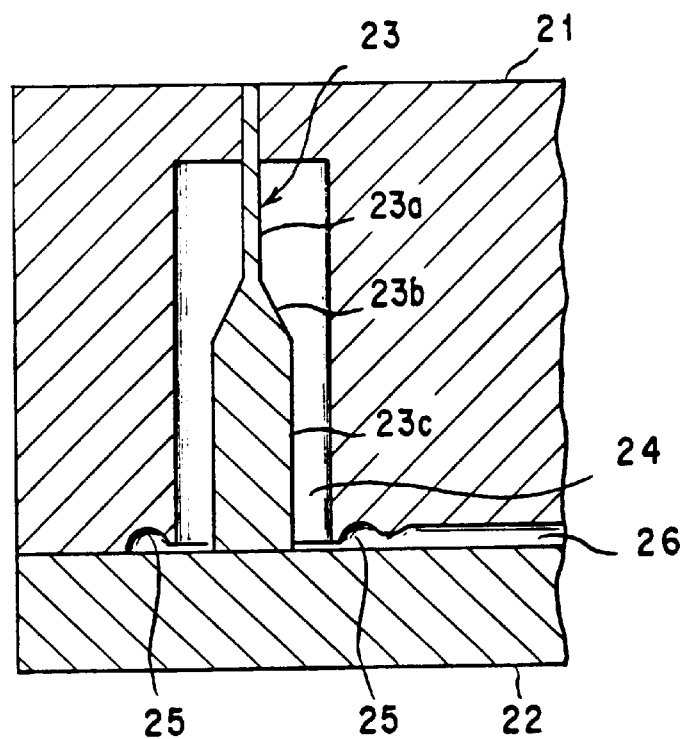
FIG. 11 is a fragmentary schematic cross section of one example of the injection molding die used for the method of the present invention.

First, a mixture of a binder with a ceramic powder is injected through a sprue 26 into a cavity 24 defined by die segments 21 and 22 and a core pin 23 as illustrated in FIG. 11, for example, through the medium of an annular runner 25 disposed around the lower part of the die segment 21 to produce a ceramic blank. The ceramic powder to be used herein may be any of the known ceramic powders such as the powder of zirconia or alumina. Preferably, the powder of zirconia is used. The binder to be used herein may be any of the known resins such as, for example, acrylic resin.

The core pin 23 is so shaped as to have a part 23a of a small diameter and a part 23c of a large diameter interconnected by a tapered part 23b in conformity with the shape of the through-hole of the ferrule mentioned above and have a small length for the part 23a of a small diameter as compared with the core pin used by the conventional method. It, therefore, achieves ease in fabrication, abounds in strength, and enjoys a long service life. Owing to the great strength of the core pin, the pressure for the injection molding can be heightened and the ceramic blank to be manufactured has a texture so tightly packed as yields only sparingly to deformation by shrinkage. As a result, the ferrule to be obtained enjoys high dimensional accuracy.

The formation of such engaging grooves 6a, 6b, and 6c of the ferrules 1a, 1b, and 1c adapted to receive a rotational driving force as illustrated in FIG. 4A through FIG. 6B can be easily attained by forming a projecting part at a corresponding position on the inner surface of the die segment 21 or on the outer peripheral surface of the core pin 23.

Figure 12:
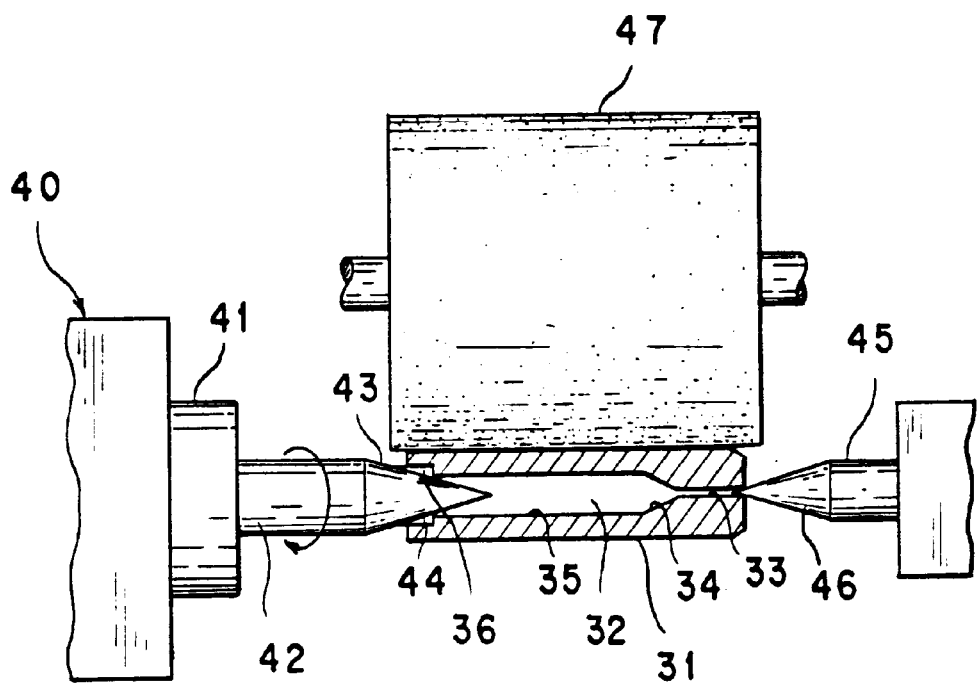
FIG. 12 is a schematic diagram to aid in the description of the operation of a double center cylindrical grinder used for implementing the method of the present invention.

The ceramic blank which has been injection molded as described above is subsequently calcined in accordance with a standard method. Since the ceramic blank is slightly shrunken by the calcining, the dimensions of the core pin 23 for the die are so set that the outside diameters of the part 23a of a small diameter and the part 23c of a large diameter are slightly smaller respectively than the inside diameters of a small diameter part 33 for the insertion of an optical fiber and a large diameter part 35 for the insertion of a sheathed optical fiber of a through-hole 32 in the calcined ceramic blank 31 (FIG. 12). The reference numeral 34 denotes a diametrically tapered part.

Then, a wire is passed through the through-hole 32 of the ceramic blank and a wire lapping work is performed on the small diameter part 35 for the insertion of an optical fiber in accordance with a standard method.

Thereafter, as illustrated in FIG. 12, a conically pointed part 46 of a supporting center 45, i.e. one of the opposite centers of a double center cylindrical grinder 40, is inserted into the small diameter part 33 of the through-hole 32 in the ceramic blank 31 manufactured as mentioned above and a conically pointed part 43 of a live center 42 attached to a rotating member 41, i.e. another center of the double center cylindrical grinder 40, is inserted into the large diameter part 35 for the insertion of a sheathed optical fiber in the ceramic blank 31 so as to support rotatably the opposite end parts of the ceramic blank 31. On the conically pointed part 43 of the live center 42, fitting parts 44 adapted to be meshed with the engaging parts (grooves) 36 of the ceramic blank 31 adapted to receive a rotational driving force is formed. Owing to the engagement of the grooves 36 with the fitting parts 44, the rotational driving force of the live center 42 is transmitted to the ceramic blank 31. By setting the rotating member 41 operating, therefore, the live center 42 attached thereto and the ceramic blank 31 engaged with the live center 42 are rotated. The grinding work for the impartation of outside diameters is implemented by keeping the ceramic blank 31 in rotation and meanwhile bringing a rotating grindstone 47 disposed above the ceramic blank 31 into contact with the outer peripheral surface of the ceramic blank 31.

The fitting parts 44 to be formed on the live center 42 may be formed in any of various shapes as illustrated in FIG. 13A through FIG. 16B.

Figure 13A:
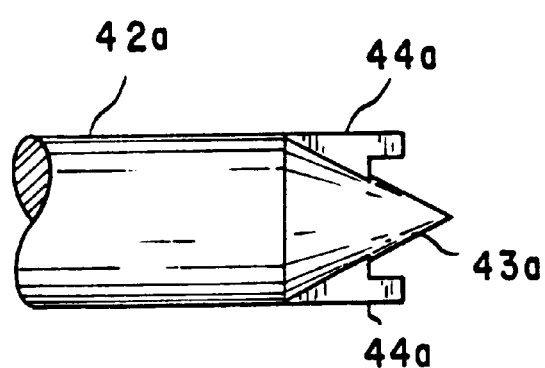
FIG. 13A is a fragmentary enlarged front view of one example of a live center of the double center cylindrical grinder used for implementing the method of the present invention and FIG. 13B is a right side view thereof.
Figure 13B:
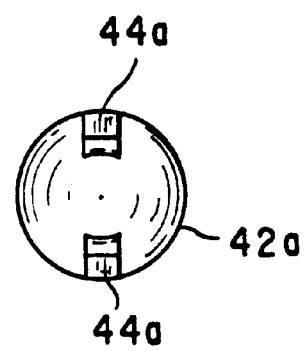
Figure 14A:
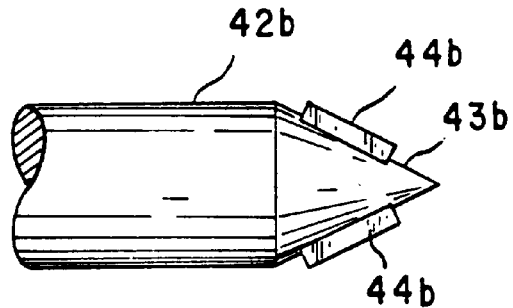
FIG. 14A is a fragmentary enlarged front view of another example of a live center of the double center cylindrical grinder and FIG. 14B is a right side view thereof.
Figure 14B:
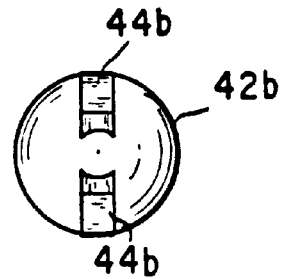
Figure 15A:
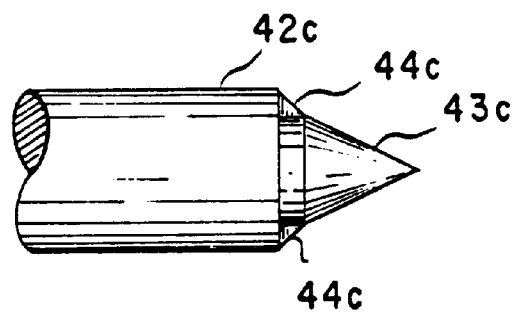
FIG. 15A is a fragmentary enlarged front view of yet another example of a live center of the double center cylindrical grinder and FIG. 15B is a right side view thereof.
Figure 15B:
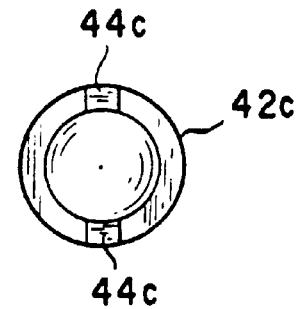
Figure 16A:
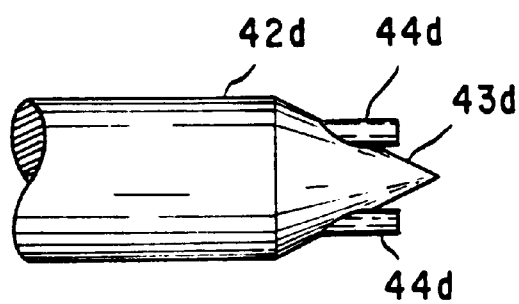
FIG. 16A is a fragmentary enlarged front view of still another example of a live center of the double center cylindrical grinder and FIG. 16B is a right side view thereof.
Figure 16B:
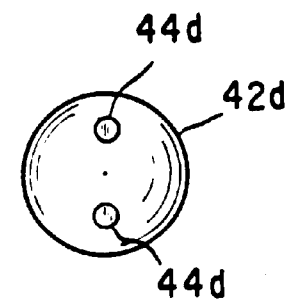

FIGS. 13A and 13B illustrate an example having a pair of opposite rodlike projecting parts 44a formed as parallelly thrust forward formed on a conically pointed part 43a of a live center 42a. FIGS. 14A and 14B illustrate an example having a pair of opposite elongated projecting parts 44b formed along the conically inclined surface of a pointed part 43b of a live center 42b. FIGS. 15A and 15B illustrate an example having a pair of nearly triangular projecting parts 44c formed oppositely at the basal part of a conically pointed part 43c of a live center 42c. Finally, FIGS. 16A and 16B illustrate an example having a pair of opposite pinlike projecting parts 44d thrust from the substantially central part of the slope of a conically pointed part 43d of a live center 42d. The projecting parts 44a illustrated in FIGS. 13A and 13B are fit for engagement with the engaging parts 6a illustrated in FIGS. 4A and 4B, the projecting parts 44b and 44c illustrated in FIGS. 14A and 14B and FIGS. 15A and 15B are fit for engagement with the engaging parts 6b illustrated in FIGS. 5A and 5B, and the projecting parts 44d illustrated in FIGS. 16A and 16B are fit for engagement with the engaging parts 6c illustrated in FIGS. 6A and 6B.

The grinding work for the impartation of an outside diameter to a ceramic blank according to the present invention is implemented by rotatably supporting the ceramic blank with a supporting center and a live center of the double center cylindrical grinder, and rotating the live center thereby rotating the ceramic blank which is engaged with the live center as described above. The grinding work, therefore, can be performed with high accuracy even when the length of the small diameter part for the insertion of an optical fiber in the ceramic blank is decreased. Unlike the conventional double center cylindrical grinder which is required to use a lathe dog, the double center cylindrical grinder to be used in the present invention allows the ceramic blank to be directly rotated by the live center and, therefore, obviates the necessity for forming a leg portion to be held on the ceramic blank. As a result, the work for cutting the leg portion and the work for attaching and detaching the lathe dog are useless herein. The grinding work for the impartation of an outside diameter to the ceramic blank can be carried out very quickly, with high productivity and yield, at a low cost.

Now, a working example which has specifically confirmed the effect of the present invention will be cited below.

As the material for the formation of a ferrule, a compound obtained by adding an acrylic resin binder to a zirconia powder so prepared as to assume an average crystal particle diameter of not more than 0.5 $\mu$m after sintering was adopted and injection molded by a known method.

The shaped article of the compound consequently obtained was dewaxed and sintered to afford a stabilized zirconia blank shaped as illustrated in FIGS. 5A and 5B and measuring 4 mm in length, $L_1$, 10.8 mm in overall ferrule length, 2.7 mm in outside diameter, and 110 $\mu$m in inside diameter of the $L_1$ part.

Figure 2:
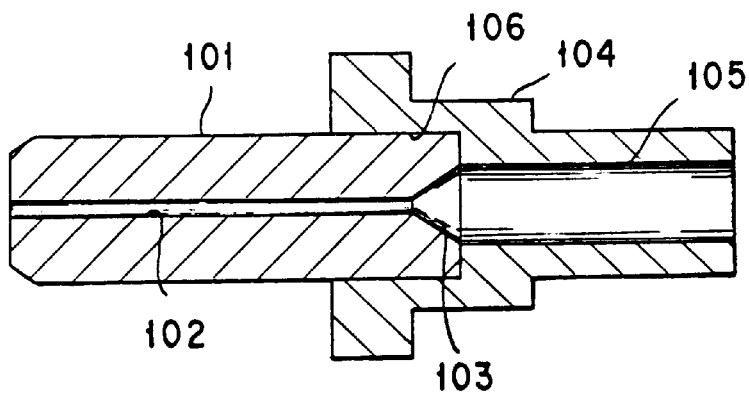
FIG. 2 is a schematic enlarged cross section of one example of the conventional ferrule for an optical fiber connector.
Figure 3:
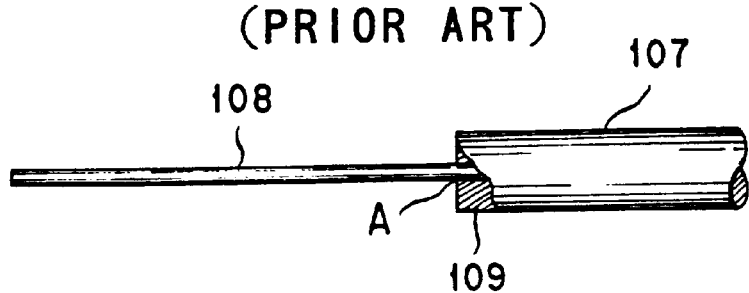
FIG. 3 is a partially cutaway schematic front view of one example of the outcome of stripping the leading end part of a conventional sheathed optical fiber of a sheath thereof.

In a comparative example, a blank having a leg portion for the grinding work formed in one end part of a ferrule 101 containing a through-hole 102 of a small diameter as illustrated in FIG. 2 was adopted.

These blanks were severally subjected to the wire lapping work for the impartation of an inside diameter and to the grinding work by the use of a double center cylindrical grinder for the impartation of an outside diameter. The grinding work for the impartation of an outside diameter was carried out by a method illustrated in FIG. 12 on the blank of the present invention and by the conventional method using a lathe dog on the blank of the comparative example. The time required for the working in each of the methods mentioned above is shown in Table 1 below.

TABLE 1

| Working | Working time (seconds) | |
|---|---|---|
| | Invention | Conventional method |
| Wire lapping work for imparting an inside diameter | 30 | 60 |
| Grinding work for imparting an outside diameter* | 40 | 120 |

Remark
*)The conventional method embraces the time for attachment and detachment of a lathe dog and the time for cutting off a leg portion in the time for the grinding work for the impartation of an outside diameter.

It is clearly noted from the results shown in Table 1 that the method of the present invention produced a notable decrease in the working time in both the wire lapping work and the grinding work.

The ferrule obtained by the method of the present invention mentioned above was tested for working accuracy. The results are shown in Table 2 below. It is noted from the results that this ferrule excelled invariably in outside diameter, roundness, cylindricality, and concentricity.

TABLE 2

| Outside diameter ($\mu$m) | Roundness ($\mu$m) | Cylindricality ($\mu$m) | Concentricity ($\mu$m) |
|---|---|---|---|
| 2499.5 ± 0.5 | not more than 0.4 | not more than 0.5 | not more than 0.7 |

The data of roundness, cylindricality, and concentricity shown above are numerical values obtained by cutting a given sample at four points indicated by the X mark in FIG. 5A, measuring the outside diameter and the inside diameter of each of the four sections, and performing the following calculations using the found diameters.

(a) Roundness: The roundness is indicated by the average of differences in radii of a circumscribing circle and an inscribing circle concentric to each other and tangent to a contour line resulting from measuring the outside diameters of the sections.

(b) Cylindricality: The cylindricality is indicated by the largest of deviations of the contour lines described at the four points of measurement in consequence of the measurement of the outside diameters of the sections.

(c) Concentricity: The concentricity is indicated by the numerical value obtained by doubling the average of deviations of the centers of outer circles obtained by the measurement of outside diameters of the sections and the centers of inner circles obtained by the measurement of inside diameters thereof.

The optical fiber connector using the ferrule obtained as described above exhibited such optical properties as an insertion loss of not more than 0.2 dB and a return loss of not less than 50 dB.

While certain specific embodiments and a working example have been disclosed herein, the invention may be embodied in other specific forms without departing from the spirit or essential characteristics thereof. The described embodiments and an example are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

What is claimed is:

1. In a method for the production of a ferrule for an optical fiber connection from a ceramic blank, grinding work for imparting an outside diameter to the ceramic blank comprises the steps of:

providing a ceramic blank having a recessed engaging part adapted to receive a rotational driving force and formed in advance at a trailing end part thereof;

rotatably supporting opposite end parts of said ceramic blank with a support center of a double center cylindrical grinder and a live center of said double center cylindrical grinder having formed thereon a projecting fitting part adapted to be engaged with said recessed engaging part of the ceramic blank; and rotating said live center thereby enabling said ceramic blank engaged with said live center to rotate and effecting grinding of an outer peripheral surface of said ceramic blank.

2. The method according to claim 1, wherein said ceramic blank is provided with a through-hole formed linearly along an axis thereof, said through-hole comprising a small diameter part for the insertion of an optical fiber, a large diameter part for the insertion of a sheathed optical fiber, and a diametrically tapered part intervening between the small diameter part and the large diameter part and diverging from said small diameter part to said large diameter part.

3. The method according to claim 1, wherein said grinding of the ceramic blank is carried out by keeping said ceramic blank in rotation and meanwhile bringing a rotating grindstone into contact with the outer peripheral surface of said cermic blank.

4. In a method for the production of a ferrule for an optical fiber connection from a ceramic blank, grinding work for imparting an outside diameter to the ceramic blank comprises the steps of:

providing a ceramic blank having a recessed engaging part adapted to receive a rotational driving force and formed in advance at a trailing end part thereof;

rotatable supporting opposite end parts of said ceramic blank with a support center of a double center cylindrical grinder and a live center of said double center cylindrical grinder having formed thereon a projecting fitting part adapted to be engaged with said recessed engaging part of the ceramic blank; and rotating said live center thereby enabling said ceramic blank engaged with said live center to rotate and effecting grinding of an outer peripheral surface of said ceramic blank, wherein said engaging part of the ceramic blank comprises at least one groove formed on either one of outer and inner peripheral edges at a free end part of said large diameter part of the ceramic blank.

5. The method according to claim 4, wherein said live center of the double center cylindrical grinder has a conically pointed part provided with at least one projecting fitting part adapted to be inserted into said groove of the ceramic blank.

6. A method for the production of a ferrule for use in an optical fiber connector, comprising:

(A) injection molding a ceramic blank which is provided with a through-hole formed linearly along an axis thereof, said through-hole comprising a small diameter part for the insertion of an optical fiber, a large diameter part for the insertion of a sheathed optical fiber, and a diametrically tapered part intervening between the small diameter part and the large diameter part and diverging from said small diameter part to said large diameter part and which is further provided at a free end part of said large diameter part with a recessed engaging part adapted to receive a rotational driving force;

(B) calcining said ceramic blank;

(C) imparting an inside diameter to said small diameter part of said ceramic blank for the insertion of said optical fiber; and (D) grinding an outside diameter to said ceramic blank, by rotatably supporting opposite end parts of said ceramic blank with a support center of a double center cylindrical grinder and a live center of said double center cylindrical grinder having formed thereon on a projecting fitting part adapted to be engaged with said recessed engaging part of the ceramic blank, rotating said live center thereby enabling said ceramic blank engaged with the live center to rotate, and bringing a rotating grindstone into contact with a peripheral surface of said ceramic blank to effect grinding work.

7. A method for the production of a ferrule for use in an optical fiber connector, comprising:

(A) injection molding a ceramic blank which is provided with a through-hole formed linearly along an axis thereof, said through-hole comprising a small diameter part for the insertion of an optical fiber, a large diameter part for the insertion of a sheathed optical fiber, and a diametrically tapered part intervening between the small diameter part and the large diameter part and diverging from said small diameter part to said large diameter part and which is further provided at a free end part of said large diameter part with a recessed engaging part adapted to receive a rotational driving force:

(B) calcining said ceramic blank;

(C) imparting an inside diameter to said small diameter part of said ceramic blank for the insertion of said optical fiber; and (D) grinding an outside diameter of said ceramic blank, by rotatable supporting opposite end parts of said ceramic blank with a support center of a double center cylindrical grinder and a live center of said double center cylindrical grinder having formed thereon on a projecting fitting part adapted to be engaged with said recessed engaging part of the ceramic blank, rotating said live center thereby enabling said ceramic blank engaged with the live center to rotate, and bringing a rotating grindstone into contact with a peripheral surface of said ceramic blank to effect grinding work, wherein said engaging part of the ceramic blank comprises at least one groove formed on either one of outer and inner peripheral edges at the free end part of said large diameter part of the ceramic blank.

8. The method according to claim 7, wherein said live center of the double center cylindrical grinder has a conically pointed part provided with at least one projecting fitting part adapted to be inserted into said groove of the ceramic blank.

9. The method according to claim 6, wherein said step (C) is carried out by wire lapping work.

* * * * *